(12) United States Patent
Watanabe

(10) Patent No.: US 12,456,899 B2
(45) Date of Patent: Oct. 28, 2025

(54) DRIVE APPARATUS

(71) Applicant: NIDEC CORPORATION, Kyoto (JP)

(72) Inventor: Yui Watanabe, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 290 days.

(21) Appl. No.: 17/893,173

(22) Filed: Aug. 23, 2022

(65) Prior Publication Data

US 2023/0065709 A1      Mar. 2, 2023

(30) Foreign Application Priority Data

Aug. 24, 2021   (JP) ................. 2021-136482

(51) Int. Cl.
| | |
|---|---|
| H02K 5/20 | (2006.01) |
| H02K 7/00 | (2006.01) |
| H02K 7/116 | (2006.01) |
| H02K 9/193 | (2006.01) |
| H02K 11/33 | (2016.01) |

(52) U.S. Cl.
CPC ............. H02K 5/203 (2021.01); H02K 7/003 (2013.01); H02K 7/116 (2013.01); H02K 9/193 (2013.01); H02K 11/33 (2016.01)

(58) Field of Classification Search
CPC ............................... H02K 9/193; H02K 5/203
USPC .......................................................... 310/54
See application file for complete search history.

(56) References Cited

U.S. PATENT DOCUMENTS

| | | | | |
|---|---|---|---|---|
| 5,939,808 A | * | 8/1999 | Adames ................. | H02K 5/203 310/58 |
| 10,879,769 B2 | | 12/2020 | Ishikawa et al. | |
| 11,502,579 B2 | * | 11/2022 | Nakamatsu .............. | B60K 1/00 |
| 11,515,758 B2 | * | 11/2022 | Ishikawa ................. | H02K 7/116 |
| 2016/0164377 A1 | * | 6/2016 | Gauthier .................. | H02K 1/32 310/54 |
| 2020/0136471 A1 | * | 4/2020 | Fukunaga ............... | H02K 11/33 |
| 2020/0266687 A1 | * | 8/2020 | Nakamatsu .............. | H02K 5/24 |
| 2021/0167667 A1 | * | 6/2021 | Ishikawa ................. | H02K 5/203 |
| 2022/0173639 A1 | | 6/2022 | Nakamatsu et al. | |

FOREIGN PATENT DOCUMENTS

| | | |
|---|---|---|
| JP | 2015107709 A | 6/2015 |
| JP | 201677117 A | 5/2016 |
| JP | 2016174443 A | 9/2016 |
| JP | 2019106776 A | 6/2019 |
| JP | 202061859 A | 4/2020 |

* cited by examiner

Primary Examiner — Alexander Talpalatski
(74) Attorney, Agent, or Firm — HAUPTMAN HAM, LLP

(57) ABSTRACT

A drive apparatus includes: a motor having a motor shaft rotatable about a motor axis; a power transmission connected to the motor shaft from one side in an axial direction; a housing having a motor housing portion accommodating the motor and a gear accommodation portion accommodating the power transmission; a channel through which a refrigerant circulates; a cooler; and a pump. The channel includes a first passage connecting a refrigerant pool in the housing and a suction port of the pump, a second passage connecting a discharge port of the pump and an inflow port of the cooler, and a third passage extending from an outflow port of the cooler to the inside of the motor housing portion. The cooler is fixed to an outside of the housing to overlap at least partially the gear accommodation portion in the radial direction above the horizontal plane including the motor axis.

13 Claims, 11 Drawing Sheets

DRIVE APPARATUS

CROSS-REFERENCE TO RELATED APPLICATIONS

The present invention claims priority under 35 U.S.C. § 119 to Japanese Patent Application No. 2021-136482 filed on Aug. 24, 2021, the entire content of which is incorporated herein by reference.

FIELD OF THE INVENTION

The present invention relates to a drive apparatus.

BACKGROUND

In an electric vehicle or a hybrid vehicle, a cooling circuit that cools a motor, a battery, and the like is mounted. A conventional cooling system cools an electric motor by an oil circulation circuit that circulates cooling oil. Conventionally, oil in the oil circulation circuit passes through a pipe disposed on the upper side of a stator. The pipe is provided with a discharge hole, and oil is supplied from the discharge hole to the stator to cool the stator.

In a refrigerant channel for cooling a motor, when the pressure loss of the refrigerant in the channel increases, the power consumption of the pump for pressure-feeding the refrigerant increases, or the pump increases in size. Therefore, it is required to configure an efficient refrigerant channel by shortening the channel length or the like.

SUMMARY

One aspect of an exemplary drive apparatus of the present invention includes: a motor having a motor shaft that rotates about a motor axis; a power transmission mechanism connected to the motor shaft from one side in an axial direction; a housing having a motor housing portion that houses the motor therein and a gear accommodation portion that houses the power transmission mechanism therein; a refrigerant contained in an inside of the housing; a refrigerant channel through which a refrigerant circulates; a cooler that cools the refrigerant; and a pump that pumps the refrigerant. The refrigerant channel includes a first flow passage connecting a refrigerant pool in the housing and a suction port of the pump, a second flow passage connecting a discharge port of the pump and an inflow port of the cooler, and a third flow passage extending from an outflow port of the cooler to the inside of the motor housing portion and supplying the refrigerant to the motor. The cooler is fixed to the outer side face of the housing in a region overlapping at least a part of the gear accommodation portion in the radial direction above the horizontal plane including the motor axis.

The above and other elements, features, steps, characteristics and advantages of the present disclosure will become more apparent from the following detailed description of the preferred embodiments with reference to the attached drawings.

DETAILED DESCRIPTION

Figure 1:
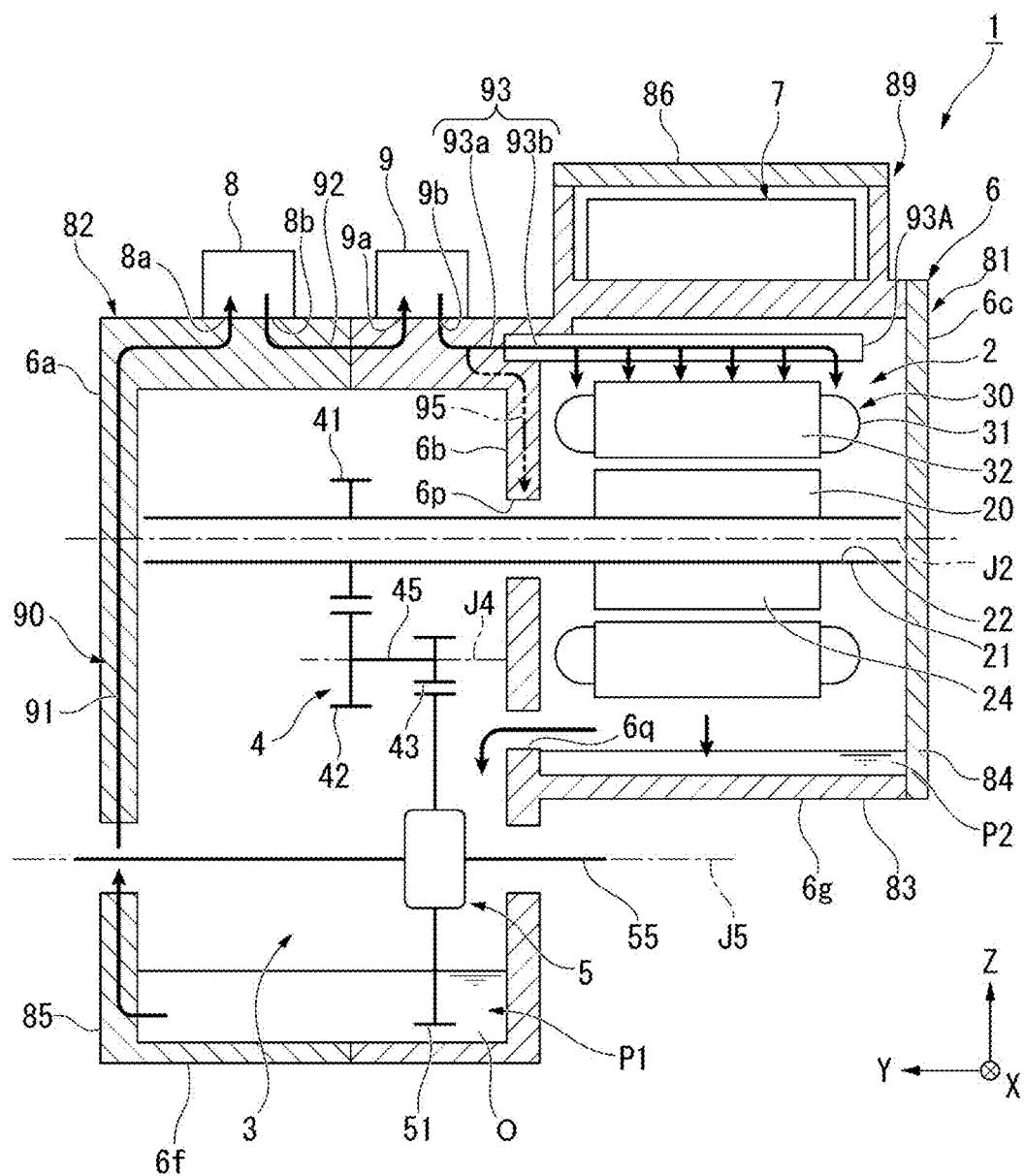
FIG. 1 is a schematic view of a drive apparatus of a first embodiment.

A drive apparatus according to an embodiment of the present invention will be described below with reference to the drawings.

In the following description, the vertical direction is defined and described based on the positional relationship when a drive apparatus of an embodiment illustrated in each drawing is mounted on a vehicle located on a horizontal road surface. In the accompanying drawings, an XYZ coordinate system is shown appropriately as a three-dimensional orthogonal coordinate system. In the XYZ coordinate system, a Z-axis direction is the vertical direction. A +Z side is an upper side in the vertical direction, and a −Z side is a lower side in the vertical direction. In the following description, the upper side and the lower side in the vertical direction will be referred to simply as the "upper side" and the "lower side", respectively. An X-axis direction is a direction orthogonal to the Z-axis direction and is a front-rear direction of a vehicle on which a drive apparatus is mounted. In the embodiment below, a +X side is a front side of a vehicle, and a −X side is a rear side of the vehicle. A Y-axis direction is a direction orthogonal to both the X-axis direction and the Z-axis direction, and is a left-right direction of the vehicle, that is, a vehicle width direction. In the following embodiment, a +Y side is a left side of the vehicle, and a −Y side is a right side of the vehicle. The front-rear direction and the right-left direction are horizontal directions orthogonal to the vertical direction.

A motor axis J2 illustrated appropriately in the drawings extends in the Y-axis direction, i.e., the left-right direction of the vehicle. In the following description, unless otherwise specified, a direction parallel to the motor axis J2 is simply referred to as an "axial direction", a radial direction centered on the motor axis J2 is simply referred to as a "radial direction", and a circumferential direction centered on the motor axis J2, that is, around the motor axis J2 is simply referred to as a "circumferential direction". In the following description, the +Y side may be simply referred to as one side in the axial direction, and the −Y side may be simply referred to as the other side in the axial direction.

FIG. 1 is a schematic view of a drive apparatus according to a first embodiment.

A drive apparatus 1 is mounted on a vehicle using a motor as a power source, such as a hybrid vehicle (HEV), a plug-in hybrid vehicle (PHV), or an electric vehicle (EV), and is used as the power source.

The drive apparatus 1 includes a motor 2, a power transmission mechanism 3, a housing 6, an inverter 7, a cooler 9, a pump 8, a refrigerant O, and a refrigerant channel 90 through which the refrigerant O circulates.

The housing 6 includes a motor housing portion 81 that houses the motor 2 therein, a gear accommodation portion 82 that houses the power transmission mechanism 3 therein, and an inverter housing portion 89 that houses the inverter 7. The gear accommodation portion 82 is located on one side (+Y side) in the axial direction of the motor housing portion 81. The inverter housing portion 89 is located above the motor housing portion 81.

In the present embodiment, the motor 2 is an inner-rotor motor. The motor 2 of the present embodiment is, for example, a three-phase AC motor. The motor 2 has both a function as an electric motor and a function as a generator. The motor 2 includes a motor shaft 21, a rotor 20, and a stator 30.

The motor shaft 21 extends along the axial direction about the motor axis J2. The motor shaft 21 rotates about the motor axis J2. The motor shaft 21 is a hollow shaft having a hollow portion 22 extending in the axial direction.

The motor shaft 21 extends across the motor housing portion 81 and the gear accommodation portion 82 of the housing 6. The motor shaft 21 is connected to the rotor 20 in the inside of the motor housing portion 81. The motor shaft 21 is connected to the power transmission mechanism 3 in the inside of the gear accommodation portion 82. That is, the power transmission mechanism 3 is connected to the motor shaft 21 from one side (+Y side) in the axial direction. The motor shaft 21 is rotatably supported by the housing 6 via a bearing (not illustrated).

The rotor 20 is fixed to the outer peripheral face of the motor shaft 21. The rotor 20 is rotatable about the motor axis J2 extending in the horizontal direction. The rotor 20 includes a rotor core 24 and a rotor magnet (not illustrated) fixed to the rotor core. The torque of the rotor 20 is transmitted to the power transmission mechanism 3.

The stator 30 encloses the rotor 20 from radially outside. The stator 30 has a stator core 32, a coil 31, and an insulator (not illustrated) interposed between the stator core 32 and the coil 31. The stator 30 is held by the housing 6. The stator core 32 has a plurality of magnetic pole teeth (not illustrated) radially inward from an inner peripheral face of an annular yoke. A coil wire is disposed between the magnetic pole teeth. The coil wire located in the gap between the adjacent magnetic pole teeth constitutes the coil 31. The insulator is made of an insulating material.

The power transmission mechanism 3 includes a plurality of gears 41, 42, 43, and 51. The power transmission mechanism 3 is connected to the rotor 20 of the motor 2 to transmit power. The power transmission mechanism 3 includes a reduction gear 4 and a differential device 5.

The reduction gear 4 has a function of increasing the torque output from the motor 2 in accordance with a reduction ratio by reducing rotation speed of the motor 2. The reduction gear 4 is connected to the motor shaft 21. The reduction gear 4 transmits the torque outputted from the motor 2 to the differential device 5.

The reduction gear 4 includes a pinion gear 41, an intermediate shaft 45, and a counter gear 42 and a drive gear 43 fixed to the intermediate shaft 45. The torque output from the motor 2 is transmitted to the ring gear 51 of the differential device 5 via the motor shaft 21, the pinion gear 41, the counter gear 42, and the drive gear 43. The number of gears, the gear ratios of the gears, and so on can be modified in various manners in accordance with a desired reduction ratio.

The pinion gear 41 is fixed to the outer peripheral face of the motor shaft 21. The pinion gear 41 rotates about the motor axis J2 together with the motor shaft 21.

The intermediate shaft 45 extends along an intermediate axis J4 parallel to the motor axis J2. The intermediate shaft 45 rotates about the intermediate axis J4.

The counter gear 42 and the drive gear 43 are arranged side by side in the axial direction. The counter gear 42 and the drive gear 43 are provided on the outer peripheral face of the intermediate shaft 45. The counter gear 42 and the drive gear 43 are connected via the intermediate shaft 45. The counter gear 42 and the drive gear 43 rotate about the intermediate axis J4. At least two of the counter gear 42, the drive gear 43, and the intermediate shaft 45 may be formed of a single member. The counter gear 42 meshes with the pinion gear 41. The drive gear 43 meshes with the ring gear 51 of the differential device 5.

The differential device 5 is a device arranged to transmit the torque outputted from the motor 2 to wheels of the vehicle. The differential device 5 has a function of transferring the torque to a pair of output shaft 55 while absorbing a difference in speed between the left and right wheels when the vehicle is turning.

The differential device 5 includes the ring gear (scraping gear) 51, a gear housing (not illustrated), a pair of pinion gears (not illustrated), a pinion shaft (not illustrated), and a pair of side gears (not illustrated). The ring gear 51 rotates about a differential axis J5 parallel to the motor axis J2. The torque outputted from the motor 2 is transferred to the ring gear 51 through the reduction gear 4.

The pair of output shafts 55 extends along the axial direction. A side gear is connected to one end of each of the pair of output shafts 55, and a wheel is connected to the other end. The pair of output shafts 55 transfers the torque of the motor 2 to the road surface via the wheels.

The housing 6 includes a housing body 83, a motor cover 84, a gear cover 85, and an inverter cover 86. The housing body 83, the motor cover 84, the gear cover 85, and the inverter cover 86 are separate members. The motor cover 84 is disposed on the other side (−Y side) in the axial direction of the housing body 83. The gear cover 85 is disposed on one side (+Y side) in the axial direction of the housing body 83. The inverter cover 86 is disposed on the upper side of the housing body 83.

The housing 6 includes the motor housing portion 81, the gear accommodation portion 82, and the inverter housing portion 89. The motor housing portion 81, the gear accommodation portion 82, and the inverter housing portion 89 are configured by the housing body 83, the motor cover 84, the gear cover 85, and the inverter cover 86.

The motor housing portion 81 includes a cylindrical portion of the housing body 83 and the motor cover 84 that covers an opening on the other side (−Y side) in the axial direction of the cylindrical portion. The motor 2 is disposed in a space surrounded by the housing body 83 and the motor cover 84.

The gear accommodation portion 82 includes a recessed portion that opens to one side (+Y side) in the axial direction of the housing body 83 and the gear cover 85 that covers the opening of the recessed portion. The power transmission mechanism 3 is disposed in a space surrounded by the housing body 83 and the gear cover.

The inverter housing portion 89 includes a box-shaped portion that opens to the upper side of the housing body 83 and the inverter cover 86 that covers the opening of the box-shaped portion. The inverter 7 is disposed in a space surrounded by the housing body 83 and the inverter cover 86.

The housing 6 includes a gear cover wall portion (cover wall portion) 6a, a partition 6b, and a motor cover wall portion 6c extending along a plane orthogonal to the motor axis J2, a gear peripheral wall portion 6f surrounding the power transmission mechanism 3 from radially outside, and a motor peripheral wall portion 6g surrounding the motor 2 from radially outside.

The gear cover wall portion 6a is provided on the gear cover 85. The gear cover wall portion 6a constitutes a part of the gear accommodation portion 82. The gear cover wall portion 6a is disposed on one side (+Y side) in the axial direction of the power transmission mechanism 3.

The motor cover wall portion 6c is provided on the motor cover 84. The motor cover wall portion 6c constitutes a part of the motor housing portion 81. The motor cover wall portion 6c is disposed on the other side (−Y side) in the axial direction of the motor 2.

The partition 6b is provided in the housing body 83. The partition 6b partitions the internal space of the motor housing portion 81 and the internal space of the gear accommodation portion 82. The partition 6b constitutes a part of the motor housing portion 81 and the gear accommodation portion 82. The partition 6b is provided with a shaft passing hole 6p and a partition opening 6q. The shaft passing hole 6p and the partition opening 6q allow internal spaces of the motor housing portion 81 and the gear accommodation portion 82 to communicate with each other. The motor shaft 21 passes through the shaft passing hole 6p.

The gear peripheral wall portion 6f is configured by a part of the housing body 83 and a part of the gear cover 85. The gear peripheral wall portion 6f constitutes a part of the gear accommodation portion 82. The gear peripheral wall portion 6f extends along the axial direction. The gear peripheral wall portion 6f connects the gear cover wall portion 6a and the partition 6b. The gear peripheral wall portion 6f surrounds the gears 41, 42, 43, and 51 from radially outside the motor axis J2, the intermediate axis J4, and the differential axis J5.

The motor peripheral wall portion 6g is provided in the housing body 83. The motor peripheral wall portion 6g constitutes a part of the motor housing portion 81. The motor peripheral wall portion 6g has a tubular shape extending along the axial direction around the motor axis J2. The motor peripheral wall portion 6g connects the partition 6b and the motor cover wall portion 6c. The motor peripheral wall portion 6g surrounds the motor 2 from radially outside the motor axis J2.

The refrigerant O is contained in the inside of the housing 6. The refrigerant O circulates in the refrigerant channel 90 described later. In the present embodiment, the refrigerant O is oil, and is used not only for cooling the motor 2 but also for lubricating the power transmission mechanism 3. An oil equivalent to a lubricating oil (ATF: Automatic Transmission Fluid) for an automatic transmission having a relatively low viscosity is preferably used as the refrigerant O so that the oil can provide functions of a lubricating oil and a cooling oil.

Refrigerant pools P1 and P2 in which the refrigerant O accumulates are provided in a lower region in the housing 6. In the present embodiment, the refrigerant O accumulates in the lower regions of the gear accommodation portion 82 and the motor housing portion 81. In the following description, the lower region in the gear accommodation portion 82 is referred to as a first refrigerant pool P1, and the lower region in the motor housing portion 81 is referred to as a second refrigerant pool P2. The refrigerant O accumulated in the first refrigerant pool P1 is scraped up by the operation of the power transmission mechanism 3 and diffused into the gear accommodation portion 82.

The refrigerant O diffused into the gear accommodation portion 82 is supplied to each gear of the power transmission mechanism 3 in the gear accommodation portion 82 to spread the refrigerant O over the tooth surfaces of the gears. The refrigerant O supplied to the power transmission mechanism 3 and used for lubrication drops and is collected in the first refrigerant pool P1 in the gear accommodation portion 82.

The refrigerant O in the first refrigerant pool P1 is sent to the inside of the motor housing portion 81 by a refrigerant channel 90 to be described later. The refrigerant O sent to the inside of the motor housing portion 81 drops from the motor 2 and accumulates in the second refrigerant pool P2. Part of the refrigerant O accumulated in the second refrigerant pool P2 moves to the gear accommodation portion 82 via the partition opening 6q and returns to the first refrigerant pool P1.

In the present specification, "the refrigerant is contained in the inside of a certain portion" means that the refrigerant may be located in the inside of the certain portion at least in part while the motor is being driven, or the refrigerant may not be located in the inside of the certain portion when the motor is stopped. For example, in the present embodiment, that the refrigerant O is contained in the motor housing portion 81 means that the refrigerant O only needs to be located in the inside of the motor housing portion 81 at least in part while the motor 2 is being driven, or when the motor 2 is stopped, all the refrigerant O in the inside of the motor housing portion 81 may move to the gear accommodation portion 82 through the partition opening 6q. Part of the refrigerant O sent to the inside of the motor housing portion 81 by the refrigerant channel 90 to be described later may remain in the inside of the motor housing portion 81 in a state where the motor 2 is stopped.

The refrigerant O circulates in the refrigerant channel 90 in the drive apparatus 1. The refrigerant channel 90 is a channel for supplying the refrigerant O from the first refrigerant pool P1 to the motor 2 and returning the refrigerant O to the first refrigerant pool P1 again.

In the present specification, the "refrigerant flow passage" means a channel of the refrigerant O circulating in the housing 6 (or inside and outside the housing 6). Accordingly, the "refrigerant flow passage" is a concept including not only a "flow passage" that constantly forms a steady flow of the refrigerant in one direction but also a channel (for example, a channel functioning as a catch tank) that temporarily retains the refrigerant, a channel through which the refrigerant drips, and a channel through which the refrigerant is scattered.

The refrigerant channel 90 is provided with a pump 8, a cooler 9, and a supply pipe 93A. The pump 8 and the cooler 9 are each fixed to the outer side face of the housing 6. The supply pipe 93A is disposed directly above the motor 2 in the inside of the motor housing portion 81.

The cooler 9 cools the refrigerant O in the refrigerant channel 90. An internal flow passage (not illustrated) through which the refrigerant O flows and an internal flow passage (not illustrated) through which the cooling water flows are provided in the inside of the cooler 9. The cooler 9 is a heat exchanger that cools the refrigerant O by transferring heat of the refrigerant O to cooling water. The cooler 9 has an inflow port 9a and an outflow port 9b. The refrigerant O flows into the internal flow passage of the cooler 9 from the inflow port 9a and flows out from the outflow port 9b.

The pump 8 is an electric pump driven by electricity. The pump 8 may be a mechanical pump that operates in accordance with the drive of the power transmission mechanism 3. The pump 8 pumps the refrigerant O in the refrigerant channel 90. The pump 8 has a suction port 8a and a discharge port 8b. The refrigerant O is sucked into the pump 8 from the suction port 8a and discharged from the discharge port 8b.

The refrigerant channel 90 of the present embodiment includes a first flow passage 91, a second flow passage 92, and a third flow passage 93. The entire lengths of the first flow passage 91 and the second flow passage 92 and a part of the third flow passage 93 are holes provided in the housing 6. The entire lengths of the first flow passage 91 and the second flow passage 92 and a part of the third flow passage 93 are formed by drilling a wall portion of the housing 6. The other part of the third flow passage 93 is provided in the inside of the supply pipe 93A.

The first flow passage 91 connects the first refrigerant pool P1 of the housing 6 and the suction port 8a of the pump 8. The upstream end portion of the first flow passage 91 opens to the first refrigerant pool P1. The first flow passage 91 is disposed in the inside of the gear cover wall portion 6a along the wall surface of the gear cover wall portion 6a of the gear cover 85.

The second flow passage 92 connects the discharge port 8b of the pump 8 and the inflow port 9a of the cooler 9. The second flow passage 92 supplies the refrigerant O from the pump 8 to the cooler 9. The second flow passage 92 extends from one side to the other side in the axial direction. The second flow passage 92 is provided in the gear peripheral wall portion 6f of the gear accommodation portion 82. The second flow passage 92 extends across the housing body 83 and the gear cover 85.

The third flow passage 93 extends from the outflow port 9b of the cooler 9 to the inside of the supply pipe 93A. The third flow passage 93 includes an intra-wall flow passage 93a passing through the inside of the housing 6 and an intra-pipe flow passage 93b passing through the inside of the supply pipe 93A.

The intra-wall flow passage 93a extends from the outflow port 9b of the cooler 9 to the other side (−Y side) in the axial direction. The intra-wall flow passage 93a opens to the internal space of the motor housing portion 81. The supply pipe 93A is inserted into and fixed to the opening of the intra-wall flow passage 93a. The supply pipe 93A extends in the axial direction directly above the motor 2 in the inside of the motor housing portion 81.

In addition, in this specification, "directly above" means that they are disposed so as to overlap each other as viewed from above and the up-down direction. Similarly, "directly below" means to be disposed so as to overlap each other as viewed from the lower side and the vertical direction.

The intra-pipe flow passage 93b extends along the axial direction in the inside of the supply pipe 93A. The refrigerant O supplied to the intra-pipe flow passage 93b flows along the axial direction on the upper side of the motor 2. The supply pipe 93A is provided with an injection hole opened to the motor 2 side. The refrigerant O in the intra-pipe flow passage 93b is injected to the stator 30 via the injection hole. That is, the third flow passage 93 extends into the inside of the motor housing portion 81 in the intra-pipe flow passage 93b and supplies the refrigerant O to the motor 2 from the outside.

The refrigerant O supplied to the motor 2 takes heat from the stator 30 at the time of transmitting the surface of the stator 30, and cools the stator 30. Further, the refrigerant O drops from the stator 30, reaches the second refrigerant pool P2, and returns to the first refrigerant pool P1 via the partition opening 6q.

According to the present embodiment, by disposing the motor 2 in the passage of the refrigerant channel 90 and supplying the refrigerant O to the motor 2, it is possible to cool the motor 2 and suppress the temperature of the motor 2 from being excessively increased, and it is possible to enhance the reliability of the motor 2.

In the present embodiment, the cooler 9 is externally fixed to the outer side face of the housing 6 in a region overlapping at least a part of the gear accommodation portion 82 in the radial direction above the horizontal plane including the motor axis J2. Therefore, the cooler 9 can be easily disposed close to the motor 2, and the third flow passage 93 connected to the cooler 9 can be shortened. As a result, heat absorption of the refrigerant O from the cooler 9 to the motor 2 can be suppressed, and the temperature of the refrigerant O supplied to the motor 2 can be kept low. According to the present embodiment, by shortening the third flow passage 93, it is possible to provide the drive apparatus 1 having the efficient refrigerant channel 90 in which the pipeline resistance of the refrigerant channel 90 is suppressed.

In particular, the cooler 9 of the present embodiment is fixed to the gear peripheral wall portion 6f of the gear accommodation portion 82. As a result, the cooler 9 can be more easily disposed closer to the motor 2 than in a case where the cooler 9 is fixed to the gear cover wall portion 6a of the gear accommodation portion 82. According to the present embodiment, since the cooler 9 is disposed above the horizontal plane including the motor axis J2, it is easy to efficiently supply the refrigerant O flowing out from the outflow port 9b of the cooler 9 to the motor 2 using gravity.

In the present embodiment, the inflow port 9a and the outflow port 9b of the cooler 9 are arranged side by side in the axial direction. The outflow port 9b of the cooler 9 is disposed on the other side (−Y side) in the axial direction with respect to the inflow port 9a. Therefore, the outflow port 9b of the cooler 9 can be disposed close to the motor 2, and the third flow passage 93 can be further shortened.

The third flow passage 93 of the present embodiment passes through the inside of the supply pipe 93A and supplies the motor 2 with the refrigerant O via the exhaust hole of the supply pipe 93A. Therefore, the pressure in the inside of the supply pipe 93A can be increased using the discharge pressure of the pump 8, and the refrigerant O can be scattered far from the exhaust hole. As a result, the refrigerant O easily reaches a complicated portion of the motor 2, and the motor 2 can be effectively cooled.

Instead of the supply pipe 93A, a gutter catch tank may be disposed directly above the motor 2. In this case, the catch tank may be provided with a discharge port, and the refrigerant O stored in the catch tank may be supplied to the motor 2 by dropping the refrigerant O on the motor 2.

In the present embodiment, the refrigerant pool connected to the first flow passage 91 is the first refrigerant pool P1 provided in the lower region in the housing 6. Similarly to the cooler 9, the pump 8 is fixed to the outer side face of the housing 6 in a region overlapping at least a part of the gear accommodation portion 82 in the radial direction above the horizontal plane including the motor axis J2. Therefore, the pump 8 and the cooler 9 can be disposed close to each other, and the second flow passage 92 connecting the pump 8 and the cooler 9 can be shortened. In particular, since the pump 8 of the present embodiment is fixed to the gear peripheral wall portion 6f of the gear accommodation portion 82 together with the cooler 9, it is easy to further shorten the second flow passage 92.

In the present embodiment, the refrigerant pool connected to the first flow passage 91 is the first refrigerant pool P1 provided in the lower region in the gear accommodation portion 82. However, the first flow passage 91 may be a flow passage connected to the second refrigerant pool P2 provided in the lower region in the motor housing portion 81. That is, the first flow passage 91 may be connected to one or both of the first refrigerant pool P1 and the second refrigerant pool P2.

In the present embodiment, it is preferable that the pump 8 and the cooler 9 overlap at least partially with each other in the axial direction of the motor axis J2. The suction port 8a and the discharge port 8b of the pump 8, and the inflow port 9a and the outflow port 9b of the cooler 9 are arranged in this order from one side (+Y side) to the other side (−Y side) in the axial direction. Therefore, the first flow passage 91, the second flow passage 92, and the third flow passage 93 are easily arranged linearly in the gear peripheral wall portion 6f, and the refrigerant channel 90 can be simplified.

According to the present embodiment, at least one of the first flow passage 91 and the second flow passage 92 is configured by the hole provided in the wall portion of the housing 6. That is, at least one of the first flow passage 91 and the second flow passage 92 is disposed inside the wall of the housing 6. Therefore, it is not necessary to separately provide a piping member between the first refrigerant pool P1 and the pump 8, and an increase in the number of components can be suppressed. However, the first flow passage 91 and the second flow passage 92 may not be disposed inside the wall of the housing 6, and a piping member may be separately provided.

Next, a modification of the first embodiment will be described.

As indicated by an imaginary line (two-dot chain line) in FIG. 1, the refrigerant channel 90 according to the first embodiment can further adopt a configuration of a modification including a fifth flow passage 95. In the present modification, the fifth flow passage 95 is a channel for supplying the refrigerant O from the outflow port 9b of the cooler 9 to the hollow portion 22 of the motor shaft 21.

The fifth flow passage 95 is disposed in the inside of the partition 6b along the wall surface of the partition 6b. The fifth flow passage 95 extends from the outflow port 9b of the cooler 9 to the shaft passing hole 6p of the partition 6b. In the present modification, not only the fifth flow passage 95 but also the third flow passage 93 is connected to the outflow port 9b of the cooler 9. Therefore, the third flow passage 93 and the fifth flow passage 95 share a part on the upstream side. The fifth flow passage 95 is a flow passage branching from the path of the third flow passage 93 inside the wall of the housing 6. When the pump 8 having a plurality of discharge ports is used, the fifth flow passage 95 may be directly connected to one discharge port of the pump. In this case, the refrigerant channel 90 branches in the inside of the pump 8.

Figure 2:
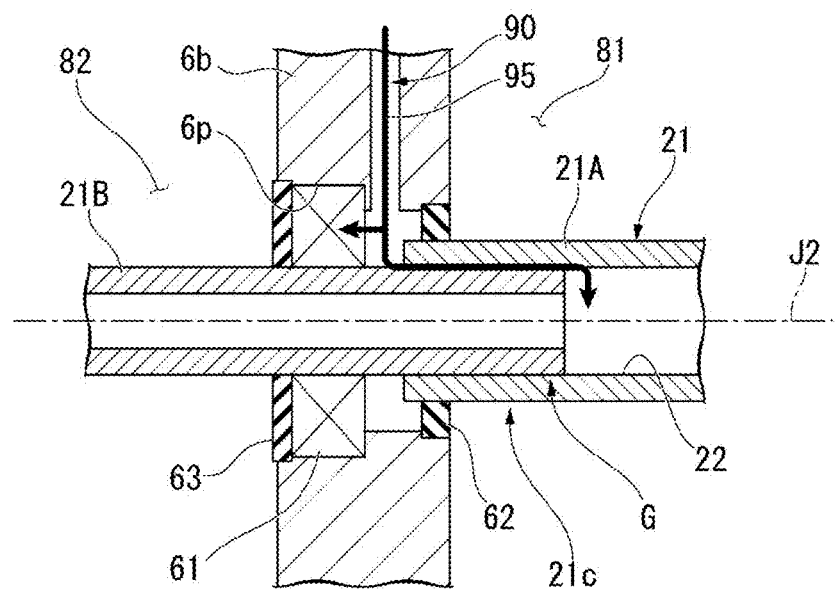
FIG. 2 is a schematic cross-sectional view of a hollow shaft and a partition according to a modification of the first embodiment.

FIG. 2 is a schematic cross-sectional view of the motor shaft 21 and the partition 6b of the present modification.

The motor shaft 21 has a hollow first hollow shaft 21A and a hollow second hollow shaft 21B. The first hollow shaft 21A is disposed in the inside of the motor housing portion 81. The second hollow shaft 21B is disposed in the inside of the gear accommodation portion 82.

The first hollow shaft 21A and the second hollow shaft 21B are disposed on the motor axis J2. That is, the first hollow shaft 21A and the second hollow shaft 21B are coaxially disposed. The first hollow shaft 21A and the second hollow shaft 21B are connected to each other at a connection portion 21c. Therefore, the first hollow shaft 21A and the second hollow shaft 21B rotate synchronously about the motor axis J2.

The connection portion 21c is located at the end portion on one side (+Y side) in the axial direction of the first hollow shaft 21A. In addition, the connection portion 21c is located at the end portion on the other side (−Y side) in the axial direction of the second hollow shaft 21B. The outer diameter of the end portion on the other side (−Y side) in the axial direction of the second hollow shaft 21B is smaller than the inner diameter of the end portion on one side (+Y side) in the axial direction of the first hollow shaft 21A. Splines meshing with each other are provided on the outer peripheral face of the end portion on the other side (−Y side) in the axial direction of the second hollow shaft 21B and the inner peripheral face of the end portion on one side (+Y side) in the axial direction of the first hollow shaft 21A. The connection portion 21c is configured by inserting the end portion on the other side (−Y side) in the axial direction of the second hollow shaft 21B into the end portion on one side (+Y side) in the axial direction of the first hollow shaft 21A.

In the connection portion 21c, a slight gap G is provided between the inner peripheral face of the first hollow shaft 21A and the outer peripheral face of the second hollow shaft 21B. The gap G extends from the hollow portion 22 of the motor shaft 21 to the outside of the motor shaft 21.

At least a part of the connection portion 21c is disposed in the inside of the shaft passing hole 6p of the partition 6b. Between the inner side face of the shaft passing hole 6p and the motor shaft 21, a pair of seal members 62 and 63 arranged in the axial direction and a bearing 61 rotatably supporting the motor shaft 21 are disposed. The bearing 61 supports the second hollow shaft 21B. The bearing 61 may support the first hollow shaft 21A. Two bearings supporting the first hollow shaft 21A and the second hollow shaft 21B may be disposed in the shaft passing hole 6p.

The seal members 62 and 63 seal between the inner peripheral face of the shaft passing hole 6p and the outer peripheral face of the motor shaft 21. The gap G of the connection portion 21c and the bearing 61 are disposed between the pair of seal members 62 and 63 in the axial direction. The downstream end portion of the fifth flow passage 95 opens between the pair of seal members 62 and 63 on the inner peripheral face of the shaft passing hole 6p.

The refrigerant O flows into the inside of the shaft passing hole 6p from the fifth flow passage 95. As described above, since the seal members 62 and 63 are provided on both axial sides of the opening of the fifth flow passage 95, the refrigerant O flowing into the shaft passing hole 6p accumulates in the inside of the shaft passing hole 6p. The refrigerant O enters the hollow portion 22 of the motor shaft 21 through the gap G between the first hollow shaft 21A and the second hollow shaft 21B.

According to the present modification, the fifth flow passage 95 extends from the outflow port 9b of the cooler 9 to the connection portion 21c and supplies the refrigerant O to the hollow portion 22. The refrigerant O that has entered the hollow portion 22 is supplied to the rotor 20 and the stator 30 via, for example, a hole provided in the first hollow shaft 21A to cool the rotor 20 and the stator 30 (see FIG. 3 and the like). The refrigerant O that has entered the hollow portion 22 may be supplied to the power transmission mechanism 3 via a hole provided in the second hollow shaft 21B.

According to the fifth flow passage 95 of the present modification, the refrigerant O cooled by the cooler 9 can be supplied into the inside of the motor shaft 21. According to the present modification, the fifth flow passage 95 passes through the partition 6b. Therefore, the fifth flow passage 95 can connect the cooler 9 and the hollow portion 22 of the motor shaft 21 with the shortest distance, and can suppress the pressure loss in the fifth flow passage 95.

In the present modification, the bearing 61 is disposed between the pair of seal members 62 and 63 in the axial direction. Therefore, part of the refrigerant O accumulated between the pair of seal members 62 and 63 is supplied to the bearing 61. According to the present modification, when oil is used as the refrigerant O, lubricity of the bearing 61 that supports the motor shaft 21 can be enhanced by the refrigerant O.

In the present modification, the case where the connection portion 21c is configured by inserting the end portion of the second hollow shaft 21B into the hollow portion of the end portion of the first hollow shaft 21A has been described. However, the connection portion 21c may have a configuration in which the end portion of the first hollow shaft 21A is inserted into the hollow portion of the end portion of the second hollow shaft 21B. In this case, splines meshing with each other are provided on the outer peripheral face of the end portion of the first hollow shaft 21A and the inner peripheral face of the end portion of the second hollow shaft 21B.

Figure 3:
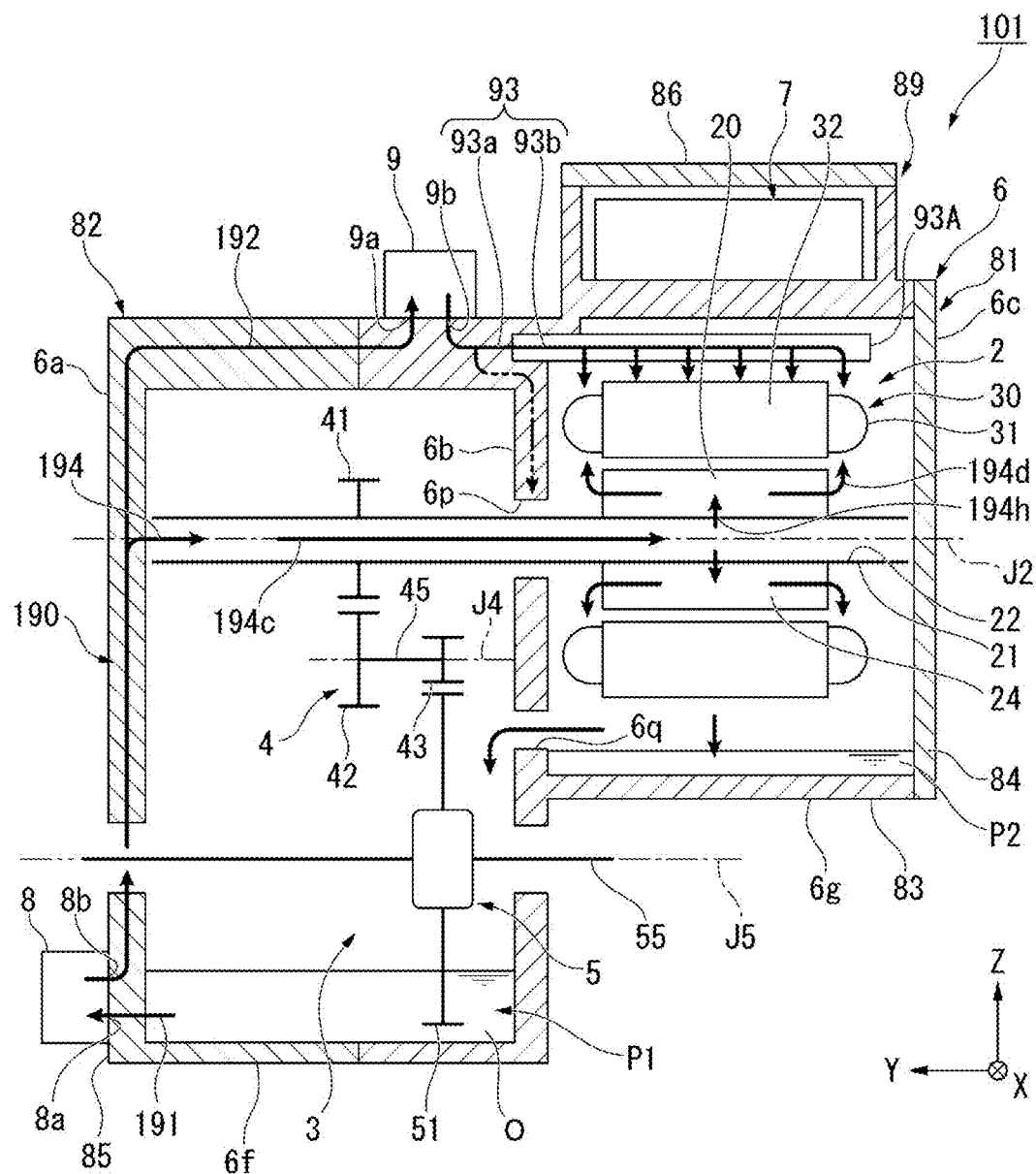
FIG. 3 is a schematic view of a drive apparatus according to a second embodiment.

FIG. 3 is a schematic view of a drive apparatus 101 according to a second embodiment.

The drive apparatus 101 of the present embodiment is different from that of the first embodiment mainly in the arrangement of the pump 8 and the configuration of the refrigerant channel 190.

Note that, in the description of each embodiment and modification described below, the same reference numerals are given to the same components as those of the embodiment already described, and the description thereof will be omitted.

Similarly to the above-described embodiment, the cooler 9 of the present embodiment is externally fixed to the outer side face of the housing 6 in a region overlapping at least a part of the gear accommodation portion 82 in the radial direction above the horizontal plane including the motor axis J2.

On the other hand, the pump 8 of the present embodiment is located below the horizontal plane including the motor axis J2. The pump 8 is fixed to the outer side face of the housing 6. More specifically, the pump 8 is fixed to the outer side face of the gear cover wall portion 6a.

The refrigerant channel 190 of the present embodiment includes a first flow passage 191, a second flow passage 192, a third flow passage 93, a fourth flow passage 194, an intra-shaft flow passage 194c, and an intra-rotor flow passage 194d. The entire lengths of the first flow passage 191, the second flow passage 192, and the fourth flow passage 194, and a part of the third flow passage 93 are holes provided in the housing 6.

The first flow passage 191 connects the first refrigerant pool P1 of the housing 6 and the suction port 8a of the pump 8. The refrigerant pool connected to the first flow passage 191 is the first refrigerant pool P1 provided in the lower region in the gear accommodation portion 82. The first flow passage 191 penetrates the gear cover wall portion 6a in the thickness direction.

According to the present embodiment, since the pump 8 is located below the horizontal plane including the motor axis J2, the pump 8 can be disposed close to the first refrigerant pool P1. As a result, the first flow passage 191 can be shortened.

The second flow passage 192 connects the discharge port 8b of the pump 8 and the inflow port 9a of the cooler 9. The second flow passage 192 is disposed in the inside of the gear cover wall portion 6a along the wall surface of the gear cover wall portion 6a in the upstream region. The gear cover wall portion 6a is a wall portion covering one side (+Y side) in the axial direction of the power transmission mechanism 3. Therefore, the second flow passage 192 extends in the vertical direction on one side (+Y side) in the axial direction of the power transmission mechanism 3. The second flow passage 192 extends in the axial direction between the housing body 83 and the gear cover 85 in the downstream region.

The fourth flow passage 194 is a flow passage branching from the path of the second flow passage 192 inside the wall of the housing 6 (more specifically, the inside of the gear cover wall portion 6a). The fourth flow passage 194 connects the discharge port 8b of the pump 8 and the end portion on one side (+Y side) in the axial direction of the intra-shaft flow passage 194c. The fourth flow passage 194 is a flow passage that supplies the refrigerant O pressure-fed to the pump 8 to the hollow portion 22 of the motor shaft 21.

The intra-shaft flow passage 194c is a channel passing through the hollow portion 22 of the motor shaft 21. In the intra-shaft flow passage 194c, the refrigerant O flows along the axial direction. The hollow portion 22 opens to the inside of the gear accommodation portion 82 at an end portion on one side (+Y side) in the axial direction. The motor shaft 21 has a communication hole 194h that extends in the radial direction and allows the inside and the outside of the hollow portion 22 to communicate with each other. The opening on the radially outer side of the communication hole 194h is connected to the intra-rotor flow passage 194d. Therefore, the communication hole 194h connects the intra-shaft flow passage 194c and the intra-rotor flow passage 194d.

The intra-rotor flow passage 194d is a channel that passes through the inside of the rotor core 24 and scatters the refrigerant O to the stator 30. When passing through the intra-rotor flow passage 194d, the refrigerant O takes heat from the rotor 20 and cools the rotor 20. A centrifugal force accompanying the rotation of the rotor 20 is applied to the refrigerant O passing through the intra-shaft flow passage 194c. The refrigerant O passes radially outward through the intra-rotor flow passage 194d, is scattered radially outward from the rotor 20, and is supplied to the stator 30 from radially inside. The refrigerant O supplied from radially inside takes heat from the stator 30 when flowing along the surface of the stator 30, and cools the stator 30 from the inner side.

According to the present embodiment, part of the refrigerant O stored in the first refrigerant pool P1 cools the motor 2 from the outside via the third flow passage 93. Another part of the refrigerant O stored in the first refrigerant pool P1 cools the motor 2 from the inside via the fourth flow passage 194. That is, according to the present embodiment, the inside and outside of the motor 2 can be cooled using the refrigerant O, and the cooling efficiency of the motor 2 can be enhanced.

Figure 4:
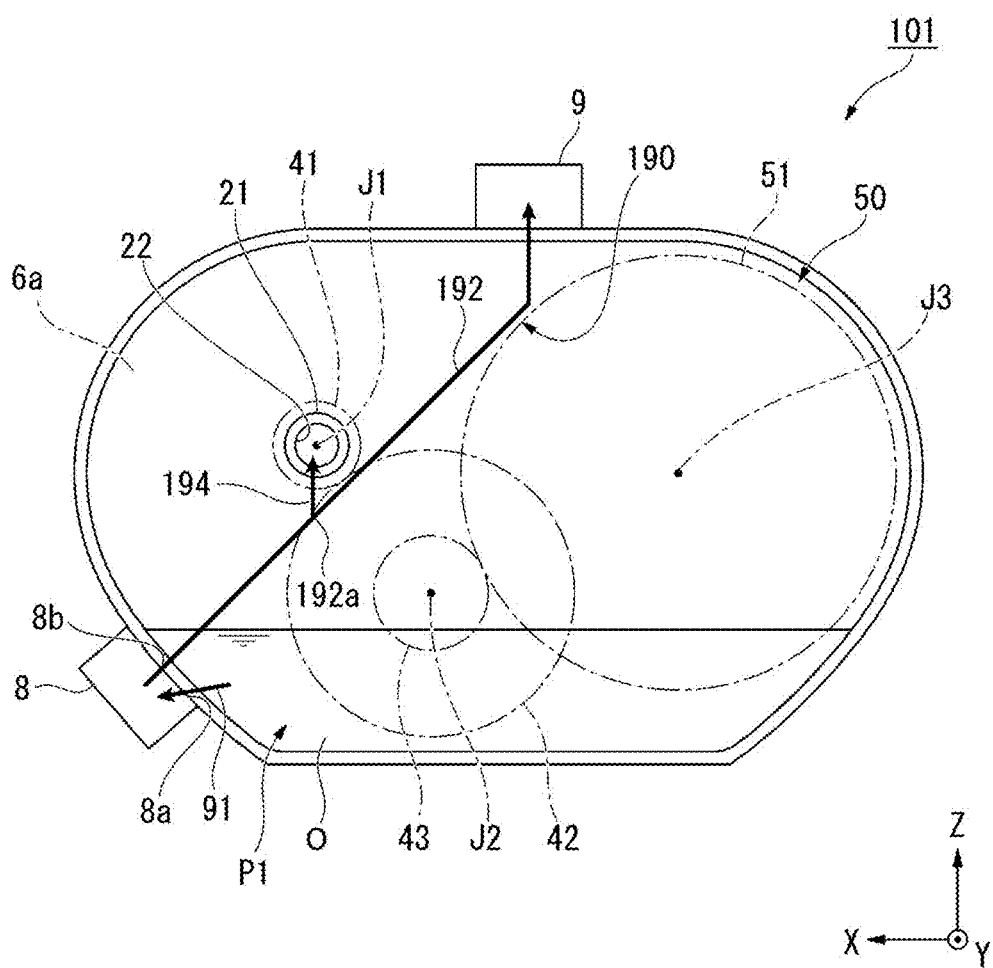
FIG. 4 is a schematic view illustrating configurations of a second flow passage and a fourth flow passage according to the second embodiment.
Figure 5:
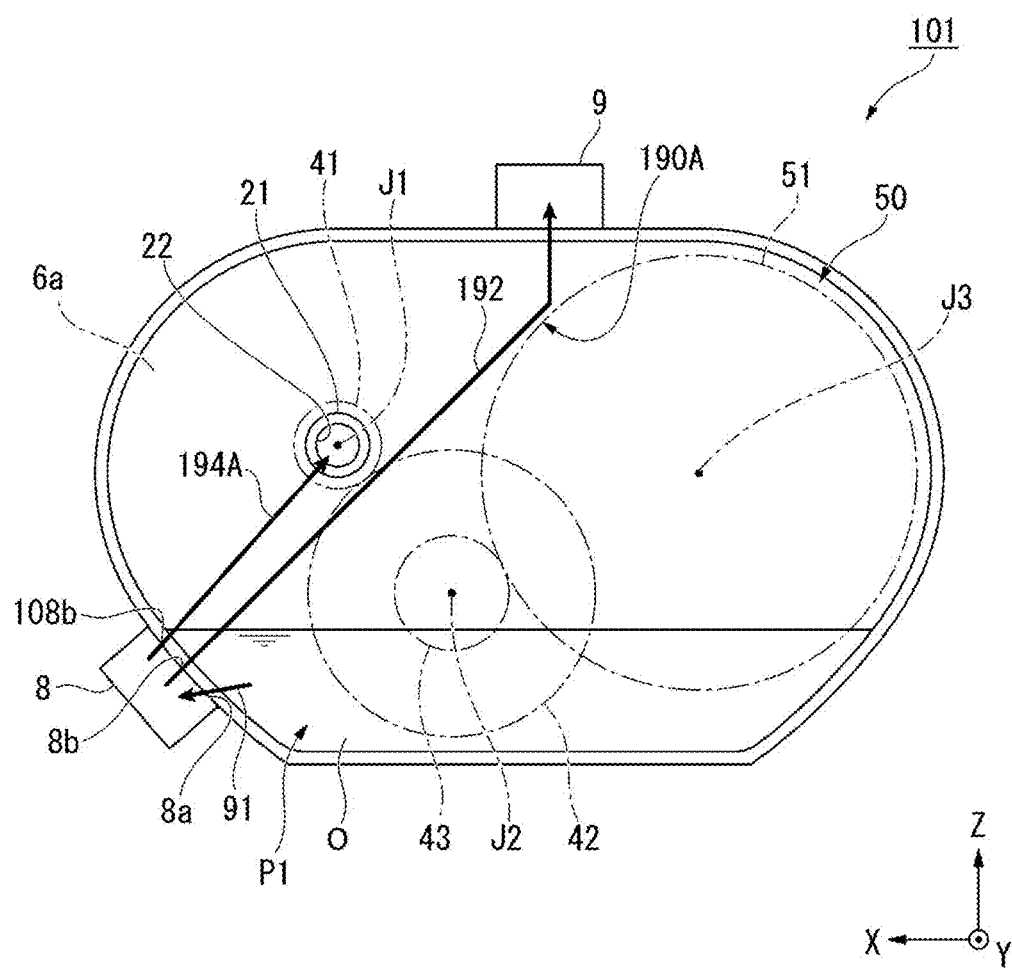
FIG. 5 is a schematic view illustrating configurations of a second flow passage and a fourth flow passage according to a modification of the second embodiment.

FIG. 4 is a schematic view illustrating configurations of the second flow passage 192 and the fourth flow passage 194 of the present embodiment. On the other hand, FIG. 5 is a schematic view illustrating configurations of the second flow passage 192 and a fourth flow passage 194A according to a modification that can be employed in the present embodiment. In any of the embodiment and the modification thereof, the second flow passage 192 and the fourth flow passages 194 and 194A are arranged in the inside of the gear cover wall portion 6a.

The fourth flow passage 194 of the present embodiment illustrated in FIG. 4 branches from the second flow passage 192 at a branch portion 192a. Therefore, the upstream regions of the second flow passage 192 and the fourth flow passage 194 are disposed in the same hole up to the branch portion 192a. The downstream regions of the second flow passage 192 and the fourth flow passage 194 are disposed in separate holes extending from the branch portion 192a.

In the modification illustrated in FIG. 5, the pump 8 has one suction port 8a and a plurality of discharge ports 8b and 108b. That is, in this modification, a refrigerant channel 190A branches in the inside of the pump 8. In the refrigerant channel 190A, the second flow passage 192 is connected to one discharge port 8b, and the fourth flow passage 194 is connected to the other discharge port 108b.

Figure 6:
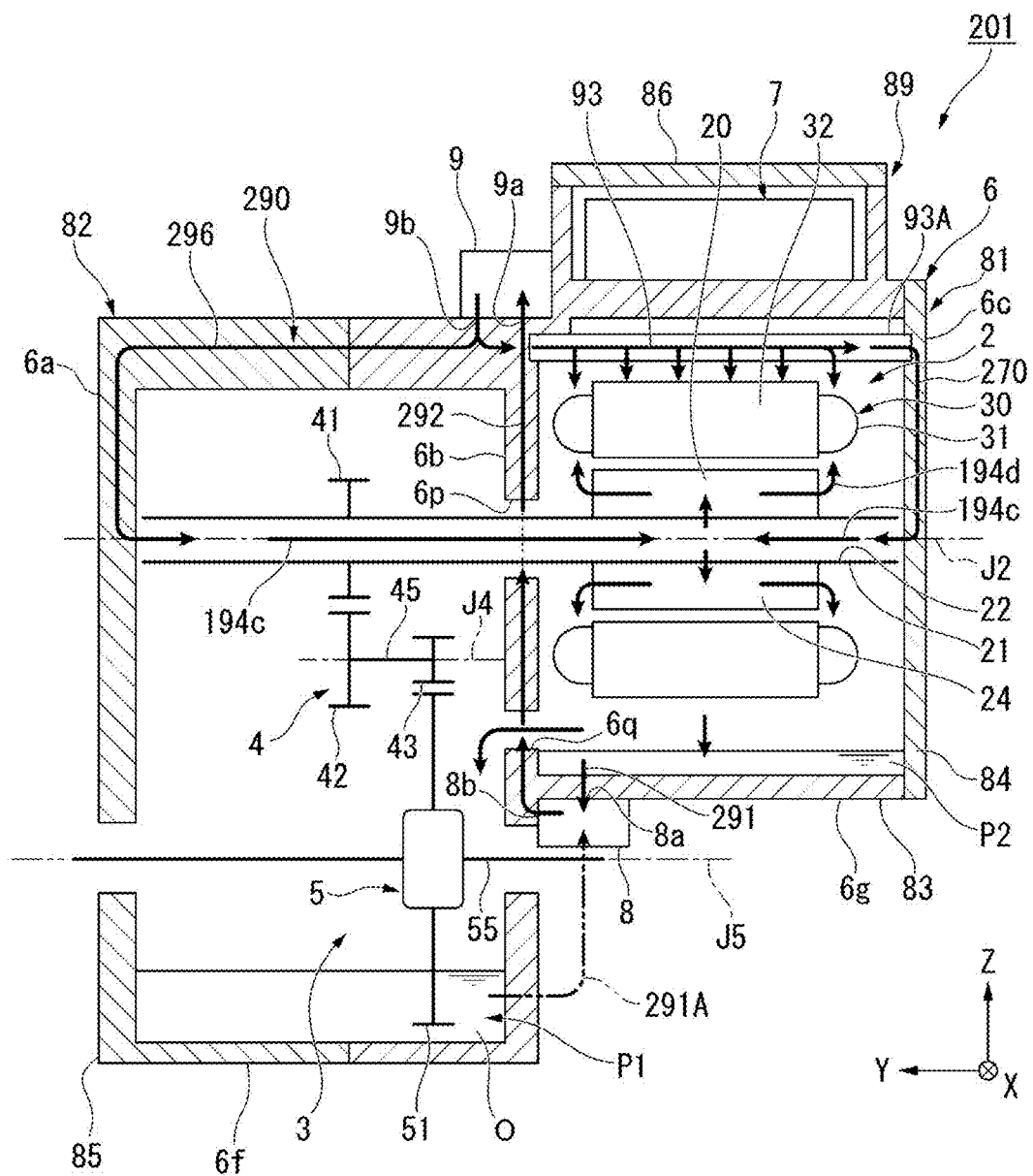
FIG. 6 is a schematic view of a drive apparatus according to a third embodiment.

FIG. 6 is a schematic view of a drive apparatus 201 according to a third embodiment.

The drive apparatus 201 of the present embodiment is different from that of the first embodiment mainly in the arrangement of the pump 8 and the configuration of the refrigerant channel 290.

The cooler 9 is externally fixed to the outer side face of the housing 6 in a region overlapping at least a part of the gear accommodation portion 82 in the radial direction above the horizontal plane including the motor axis J2. In the present embodiment, at least a part of the cooler 9 overlaps the partition 6b in the radial direction.

On the other hand, the pump 8 of the present embodiment is located below the horizontal plane including the motor axis J2. The pump 8 is fixed to the outer side face of the housing 6. More specifically, the pump 8 is fixed to the outer side face of the motor peripheral wall portion 6g.

The hollow portion 22 of the motor shaft 21 opens to the inside of the gear accommodation portion 82 at an end portion on one side (+Y side) in the axial direction, and opens to the inside of the motor housing portion 81 at an end portion on the other side (−Y side) in the axial direction.

Similarly to the above-described embodiment, the refrigerant channel 290 of the present embodiment includes a first flow passage 291, a second flow passage 292, a third flow passage 93, a sixth flow passage 296, a tenth flow passage 270, an intra-shaft flow passage 194c, and an intra-rotor flow passage 194d. The entire lengths of the first flow passage 291, the second flow passage 292, the sixth flow passage 296, and the tenth flow passage 270, and a part of the third flow passage 93 are holes provided in the housing 6.

The first flow passage 291 connects the second refrigerant pool P2 of the housing 6 and the suction port 8a of the pump 8. The refrigerant pool connected to the first flow passage 291 is the second refrigerant pool P2 provided in the lower region in the motor housing portion 81. The first flow passage 291 penetrates the motor peripheral wall portion 6g in the thickness direction.

According to the present embodiment, since the pump 8 is located below the horizontal plane including the motor axis J2, the pump 8 can be disposed close to the second refrigerant pool P2. As a result, the first flow passage 291 can be shortened.

In the present embodiment, the case where the first flow passage 291 is connected to the second refrigerant pool P2 has been described. However, as in a first flow passage 291A of a modification illustrated by an imaginary line (two-dot chain line) in FIG. 6, the first flow passage 291A may be connected to the first refrigerant pool P1. That is, the refrigerant channel 290 may include the first flow passage 291A of the modification instead of the first flow passage 291. The refrigerant channel 290 may include the first flow passage 291 connected to the first refrigerant pool P1, and the first flow passage 291A connected to second refrigerant pool P2. In this case, the two first flow passages 291 and 291A are connected to the pump 8, or the two first flow passages 291 and 291A merge in the middle of the path.

The second flow passage 292 connects the discharge port 8b of the pump 8 and the inflow port 9a of the cooler 9. The second flow passage 292 is disposed in the inside of the partition along the wall surface of the partition 6b. Therefore, the second flow passage 292 passes between the motor housing portion 81 and the gear accommodation portion 82.

According to the present embodiment, the cooler 9 overlaps the partition 6b in the radial direction. The inflow port 9a of the cooler 9 overlaps the partition 6b in the radial direction. Therefore, the second flow passage 292 passing through the inside of the partition 6b can be connected to the inflow port 9a of the cooler 9 without passing through a complicated passage. As a result, the configuration of the refrigerant channel 290 can be simplified to suppress the pipeline resistance of the refrigerant O.

The third flow passage 93 extends from the outflow port 9b of the cooler 9 to the inside of the supply pipe 93A. The third flow passage 93 extends into the inside of the motor housing portion 81 and supplies the refrigerant O to the motor 2 from the outside. The third flow passage 93 is connected to the tenth flow passage 270 of the motor cover wall portion 6c of the housing 6.

The sixth flow passage 296 connects the outflow port 9b of the cooler 9 and the end portion on one side (+Y side) in the axial direction of the intra-shaft flow passage 194c. The sixth flow passage 296 is disposed in the inside of the gear peripheral wall portion 6f and the gear cover wall portion 6a of the housing 6. The sixth flow passage 296 is a flow passage that supplies the refrigerant O pressure-fed to the pump 8 to the hollow portion 22 of the motor shaft 21. The sixth flow passage 296 is a flow passage branching from the path of the third flow passage 93. When a pump having a plurality of discharge ports is used, the sixth flow passage 296 may be directly connected to one discharge port of the pump 8. In this case, the refrigerant channel 290 branches in the inside of the pump 8.

The tenth flow passage 270 connects the downstream end portion of the third flow passage 93 and the end portion on the other side in the axial direction of the intra-shaft flow passage 194c. The tenth flow passage 270 is a flow passage that supplies part of the refrigerant O that has not been supplied to the motor 2 in the third flow passage 93 to the hollow portion 22 of the motor shaft 21. The tenth flow passage 270 is disposed in the inside of the motor cover wall portion 6c of the housing 6.

The sixth flow passage 296 and the tenth flow passage 270 are connected to the intra-shaft flow passage 194c. The refrigerant O flowing into the hollow portion 22 from one side and the other side in the axial direction joins in the intra-shaft flow passage 194c. A centrifugal force accompanying the rotation of the rotor 20 is applied to the refrigerant O passing through the intra-shaft flow passage 194c, and the refrigerant O passes radially outward through the intra-rotor flow passage 194d, is scattered radially outward from the rotor 20, and is supplied to the stator 30.

In the present embodiment, a configuration in which one or both of the sixth flow passage 296 and the tenth flow passage 270 are omitted may be adopted. That is, in the present embodiment, a configuration in which the refrigerant O is not supplied to the hollow portion 22 may be adopted, or a configuration in which the refrigerant is supplied only from one side or the other side in the axial direction may be adopted.

In the present embodiment, the refrigerant channel 290 does not pass through the internal space of the gear accommodation portion 82. The refrigerant O accumulated in the first refrigerant pool P1 of the gear accommodation portion 82 is scraped up by the gear of the power transmission mechanism 3 and diffused to the tooth surface of each gear. According to the present embodiment, since the capacity of the refrigerant O in the inside of the gear accommodation portion 82 does not decrease, it is easy to ensure the lubricity of the power transmission mechanism 3.

Figure 7:
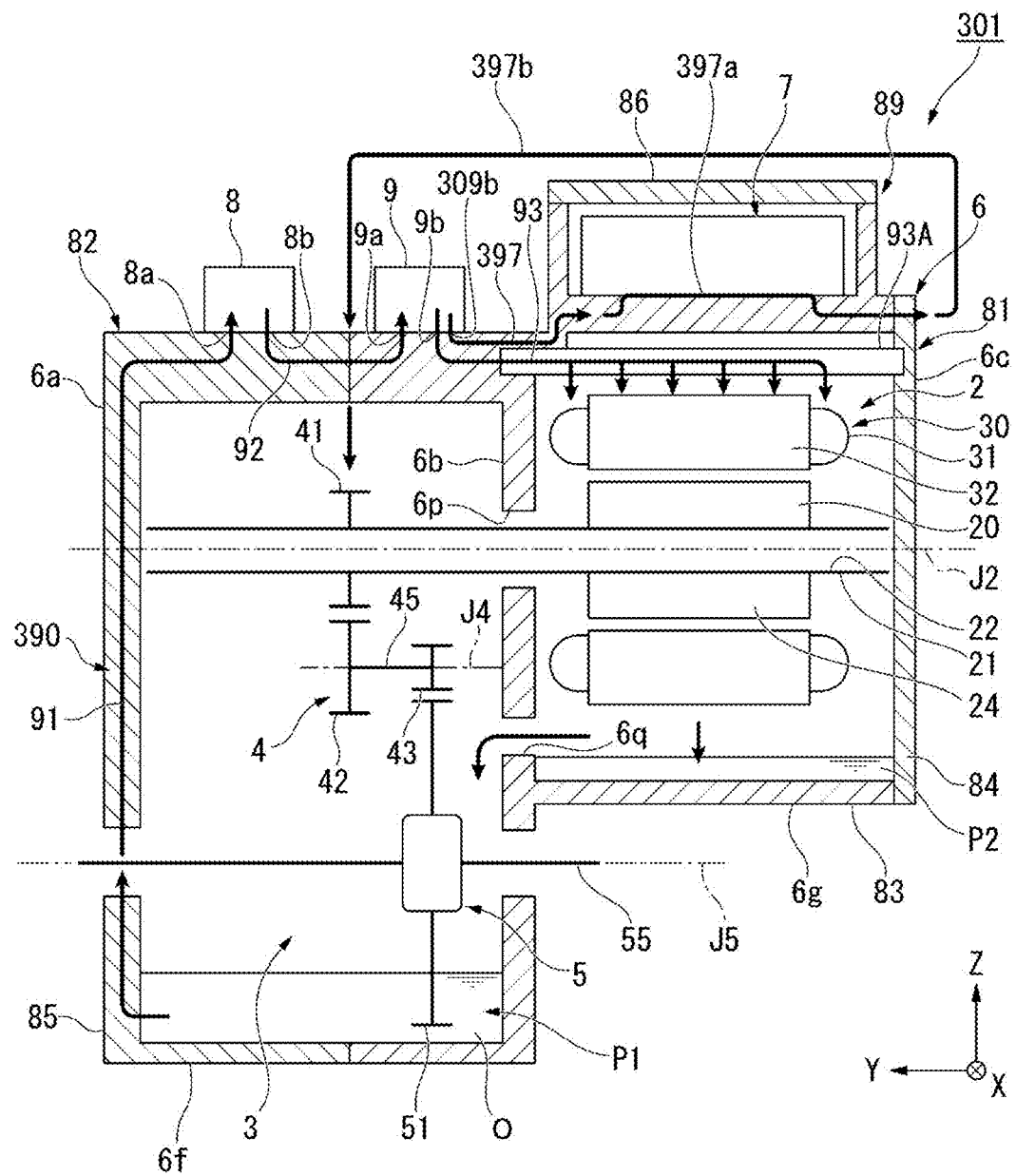
FIG. 7 is a schematic view of a drive apparatus according to a fourth embodiment.

FIG. 7 is a schematic view of a drive apparatus 301 according to a fourth embodiment.

The drive apparatus 301 of the present embodiment is different from that of the first embodiment mainly in the configuration of the refrigerant channel 390. As compared with the first embodiment, the refrigerant channel 390 of the present embodiment further includes a seventh flow passage 397, an inverter flow passage 397a, and a connection flow passage 397b.

The cooler 9 of the present embodiment has one inflow port 9a and a plurality of outflow ports 9b and 309b. That is, the refrigerant channel 390 of the present embodiment branches in the inside of the cooler 9. The third flow passage 93 is connected to one outflow port 9b of the cooler 9, and the seventh flow passage 397 is connected to the other outflow port 309b.

The seventh flow passage 397 connects the outflow port 309b of the cooler 9 and the inverter flow passage 397a. The seventh flow passage 397 is disposed inside the wall of the housing 6. More specifically, the seventh flow passage 397 extends from the inside of the wall of the gear accommodation portion 82 to the inside of the wall of the inverter housing portion 89. The seventh flow passage 397 supplies the refrigerant O cooled by the cooler 9 to the inverter 7.

The inverter flow passage 397a passes through the inverter housing portion 89 and cools the inverter 7. The inverter flow passage 397a passes through, for example, a boundary portion between the inverter housing portion 89 and the inverter 7. In this case, the refrigerant O is in direct contact with the inverter 7 to cool the inverter 7.

The connection flow passage 397b connects the downstream end portion of the inverter flow passage 397a and the internal space of the gear accommodation portion 82. The connection flow passage 397b is, for example, a flow passage disposed in a pipe connected to the housing 6. The connection flow passage 397b may be a flow passage disposed inside a wall of the housing 6. The connection flow passage 397b is a channel for returning the refrigerant O having passed through the inverter flow passage 397a to the internal space of the gear accommodation portion 82. The downstream end portion of the connection flow passage 397b is preferably open to the upper region in the gear accommodation portion 82. In this case, the refrigerant O flowing into the gear accommodation portion 82 from the downstream end portion of the connection flow passage 397b is supplied to the tooth surface of the gear of the power transmission mechanism 3 to enhance the lubricity of the power transmission mechanism 3.

Figure 8:
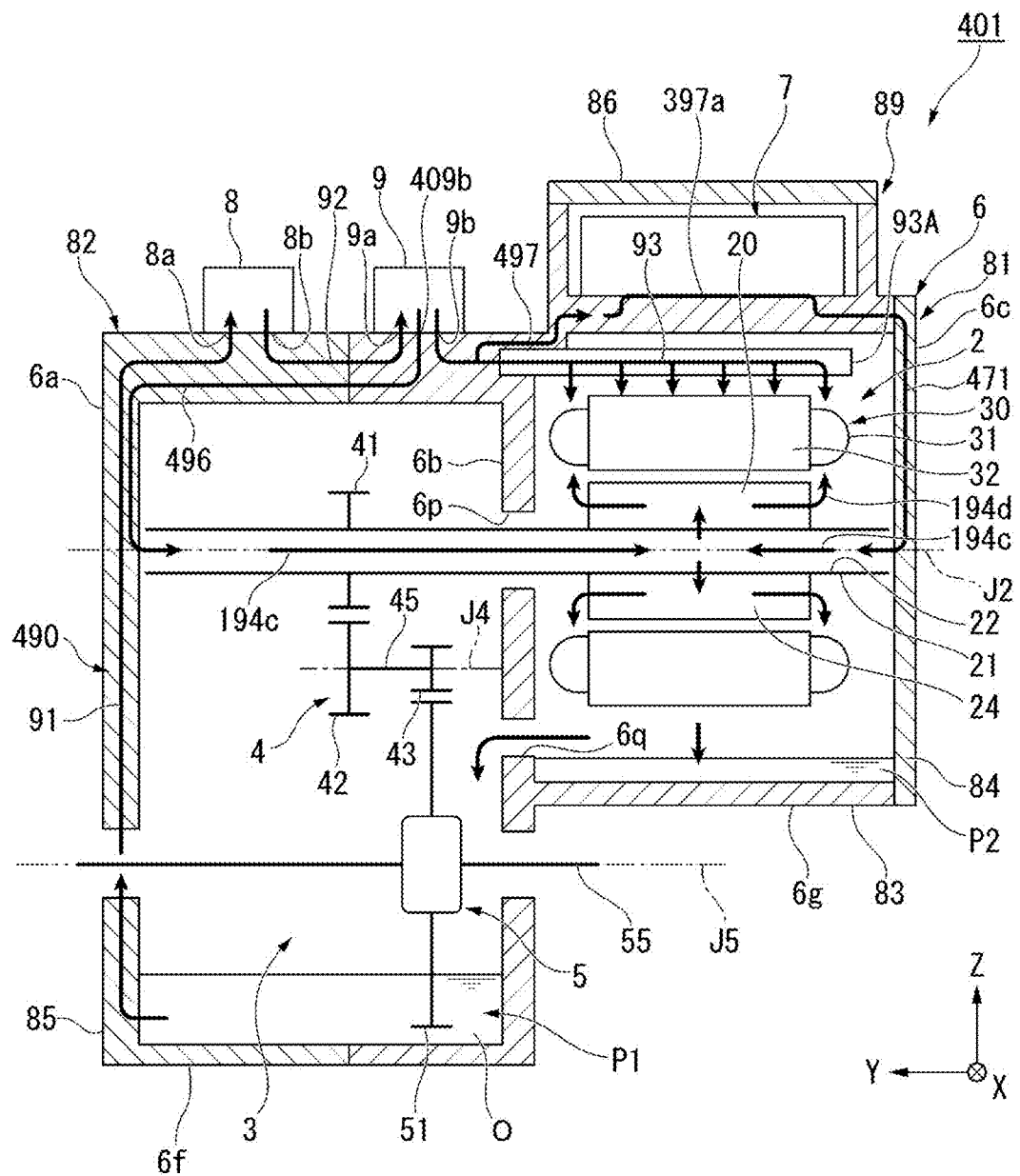
FIG. 8 is a schematic view of a drive apparatus according to a fifth embodiment.

FIG. 8 is a schematic view of a drive apparatus 401 according to a fifth embodiment.

The drive apparatus 401 of the present embodiment has a configuration similar to that of the fourth embodiment, but is mainly different from that of the fourth embodiment in the configuration of the refrigerant channel 490. The refrigerant channel 490 of the present embodiment is different from the refrigerant channel 390 of the fourth embodiment (see FIG. 7) in the configuration of a seventh flow passage 497. The refrigerant channel 490 of the present embodiment further includes a sixth flow passage 496 as compared with the refrigerant channel 390 of the fourth embodiment. Further, the refrigerant channel 490 includes an eleventh flow passage 471, an intra-shaft flow passage 194c, and an intra-rotor flow passage 194d instead of the connection flow passage 397b, as compared with the refrigerant channel 390 of the fourth embodiment.

The hollow portion 22 of the motor shaft 21 of the present embodiment opens to the inside of the gear accommodation portion 82 at an end portion on one side (+Y side) in the axial direction, and opens to the inside of the motor housing portion 81 at an end portion on the other side (−Y side) in the axial direction.

The cooler 9 of the present embodiment has one inflow port 9a and a plurality of outflow ports 9b and 409b. That is, the refrigerant channel 490 of the present embodiment branches in the inside of the cooler 9. The third flow passage 93 is connected to one outflow port 9b of the cooler 9, and the sixth flow passage 496 is connected to the other outflow port 409b.

The sixth flow passage 496 connects the outflow port 409b of the cooler 9 and the end portion on one side (+Y side) in the axial direction of the intra-shaft flow passage 194c. The sixth flow passage 496 is disposed in the inside of the gear peripheral wall portion 6f and the gear cover wall portion 6a of the housing 6. The sixth flow passage 496 is a flow passage that supplies the refrigerant O pressure-fed to the pump 8 to the hollow portion 22 of the motor shaft 21.

The seventh flow passage 497 connects the outflow port 409b of the cooler 9 and the inverter flow passage 397a. The inverter flow passage 397a passes through the inverter housing portion 89 and cools the inverter 7. The downstream end portion of the inverter flow passage 397a is connected to the eleventh flow passage 471. The seventh flow passage 497 of the present embodiment is a flow passage branching from the path of the third flow passage 93.

The eleventh flow passage 471 connects the downstream end portion of the inverter flow passage 397a and the end portion on the other side in the axial direction of the intra-shaft flow passage 194c. The eleventh flow passage 471 is a flow passage that supplies the refrigerant O having passed through the inverter flow passage 397a to the hollow portion 22 of the motor shaft 21. The eleventh flow passage 471 is disposed in the inside of the motor cover wall portion 6c of the housing 6.

The sixth flow passage 496 and the eleventh flow passage 471 are connected to the intra-shaft flow passage 194c. The refrigerant O flowing into the hollow portion 22 from one side and the other side in the axial direction joins in the intra-shaft flow passage 194c. A centrifugal force accompanying the rotation of the rotor 20 is applied to the refrigerant O passing through the intra-shaft flow passage 194c, and the refrigerant O passes radially outward through the intra-rotor flow passage 194d, is scattered radially outward from the rotor 20, and is supplied to the stator 30.

Figure 9:
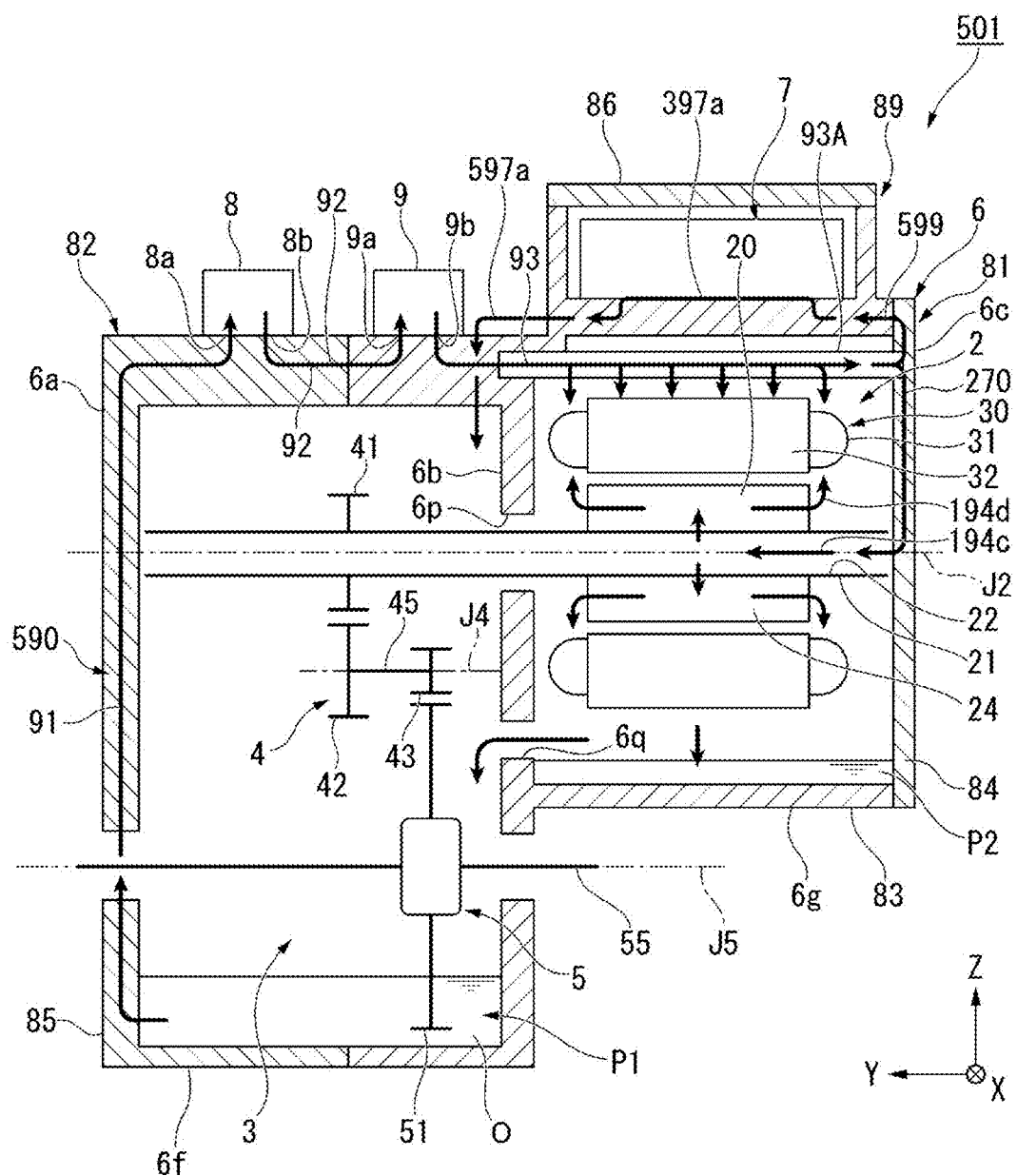
FIG. 9 is a schematic view of a drive apparatus according to a sixth embodiment.

FIG. 9 is a schematic view of a drive apparatus 501 according to a sixth embodiment.

The drive apparatus 501 of the present embodiment is different from that of the first embodiment mainly in the configuration of the refrigerant channel 590. As compared with the first embodiment, the refrigerant channel 590 of the present embodiment further includes a ninth flow passage 599, a tenth flow passage 270, an intra-shaft flow passage 194c, an intra-rotor flow passage 194d, an inverter flow passage 397a, and a connection flow passage 597a.

The ninth flow passage 599 connects the downstream end portion of the third flow passage 93 and the inverter flow passage 397a. The ninth flow passage 599 is a flow passage that supplies part of the refrigerant O that has not been supplied to the motor 2 in the third flow passage 93 to the inverter flow passage 397a. The ninth flow passage 599 is disposed inside the wall of the housing 6. The inverter flow passage 397a passes through the inverter housing portion 89 and cools the inverter 7.

The connection flow passage 597a connects the downstream end portion of the inverter flow passage 397a and the internal space of the gear accommodation portion 82. The connection flow passage 597a is, for example, a flow passage disposed in a pipe connected to the housing 6. The connection flow passage 597a may be a flow passage disposed inside a wall of the housing 6. The connection flow passage 597a is a channel for returning the refrigerant O having passed through the inverter flow passage 397a to the internal space of the gear accommodation portion 82.

The tenth flow passage 270 connects the downstream end portion of the third flow passage 93 and the end portion on the other side in the axial direction of the intra-shaft flow passage 194c. The tenth flow passage 270 is a flow passage branching from the path of the ninth flow passage 599.

The tenth flow passage 270 is connected to the intra-shaft flow passage 194c. A centrifugal force accompanying the rotation of the rotor 20 is applied to the refrigerant O passing through the intra-shaft flow passage 194c, and the refrigerant O passes radially outward through the intra-rotor flow passage 194d, is scattered radially outward from the rotor 20, and is supplied to the stator 30.

Figure 10:
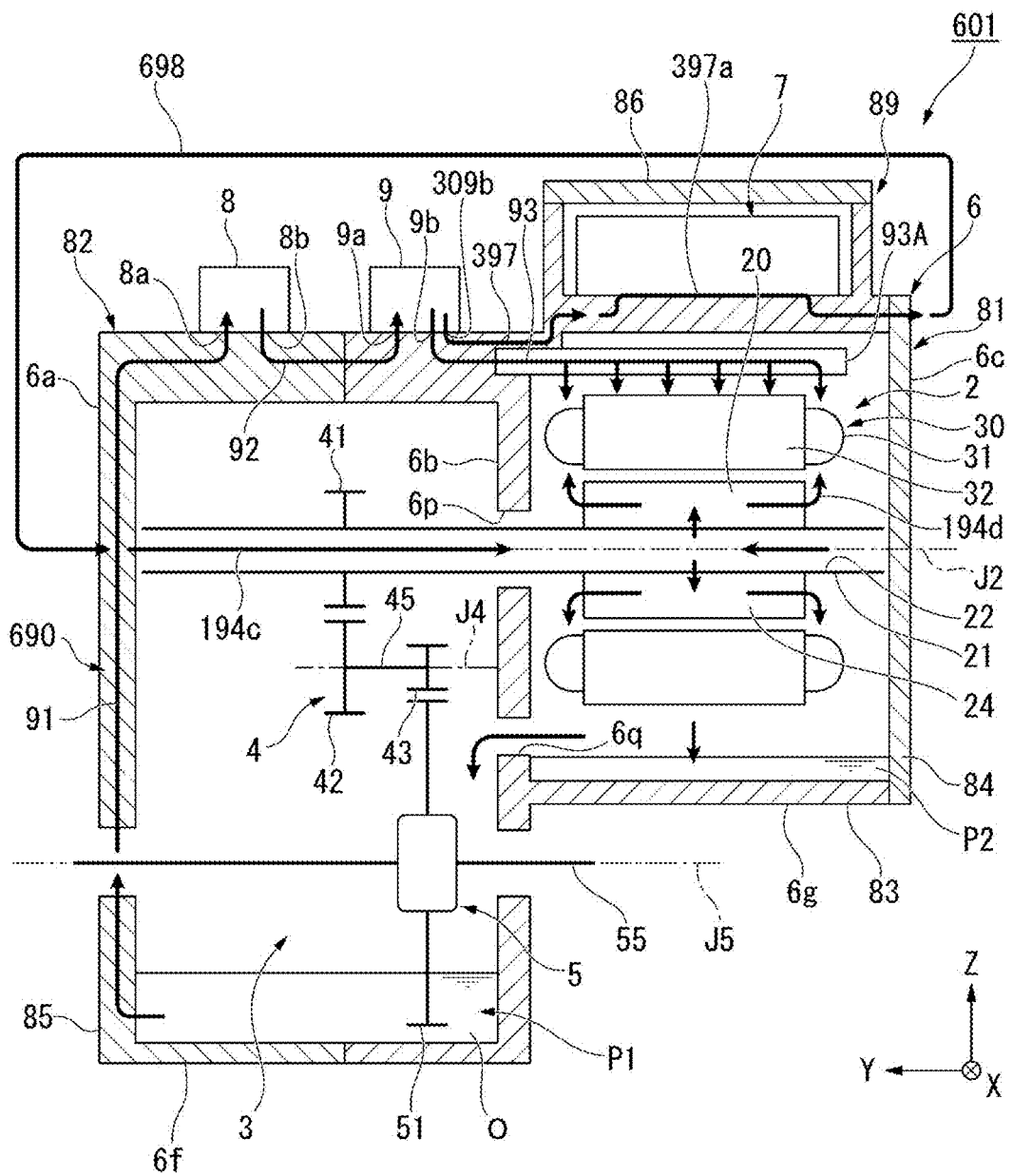
FIG. 10 is a schematic view of a drive apparatus according to a seventh embodiment.

FIG. 10 is a schematic view of a drive apparatus 601 according to a seventh embodiment.

The drive apparatus 601 of the present embodiment has a configuration similar to that of the fourth embodiment, but is mainly different from that of the fourth embodiment in the configuration of a refrigerant channel 690. The refrigerant channel 690 of the present embodiment includes an eighth flow passage 698, an intra-shaft flow passage 194c, and an intra-rotor flow passage 194d instead of the connection flow passage 397b, as compared with the refrigerant channel 390 of the fourth embodiment (see FIG. 7).

The eighth flow passage 698 connects the downstream end portion of the inverter flow passage 397a and the end portion on one side (+Y side) in the axial direction of the intra-shaft flow passage. The eighth flow passage 698 is, for example, a flow passage disposed in a pipe connected to the housing 6. The eighth flow passage 698 may be a flow passage disposed inside a wall of the housing 6. In the present embodiment, the hollow portion 22 of the motor shaft 21 opens to the inside of the gear accommodation portion 82 at the end portion on one side (+Y side) in the axial direction. The eighth flow passage 698 is a channel for guiding the refrigerant O that has passed through the inverter flow passage 397a from the opening on one side (+Y side) in the axial direction to the hollow portion 22.

The eighth flow passage 698 is connected to the intra-shaft flow passage 194c. A centrifugal force accompanying the rotation of the rotor 20 is applied to the refrigerant O passing through the intra-shaft flow passage 194c, and the refrigerant O passes radially outward through the intra-rotor flow passage 194d, is scattered radially outward from the rotor 20, and is supplied to the stator 30.

Figure 11:
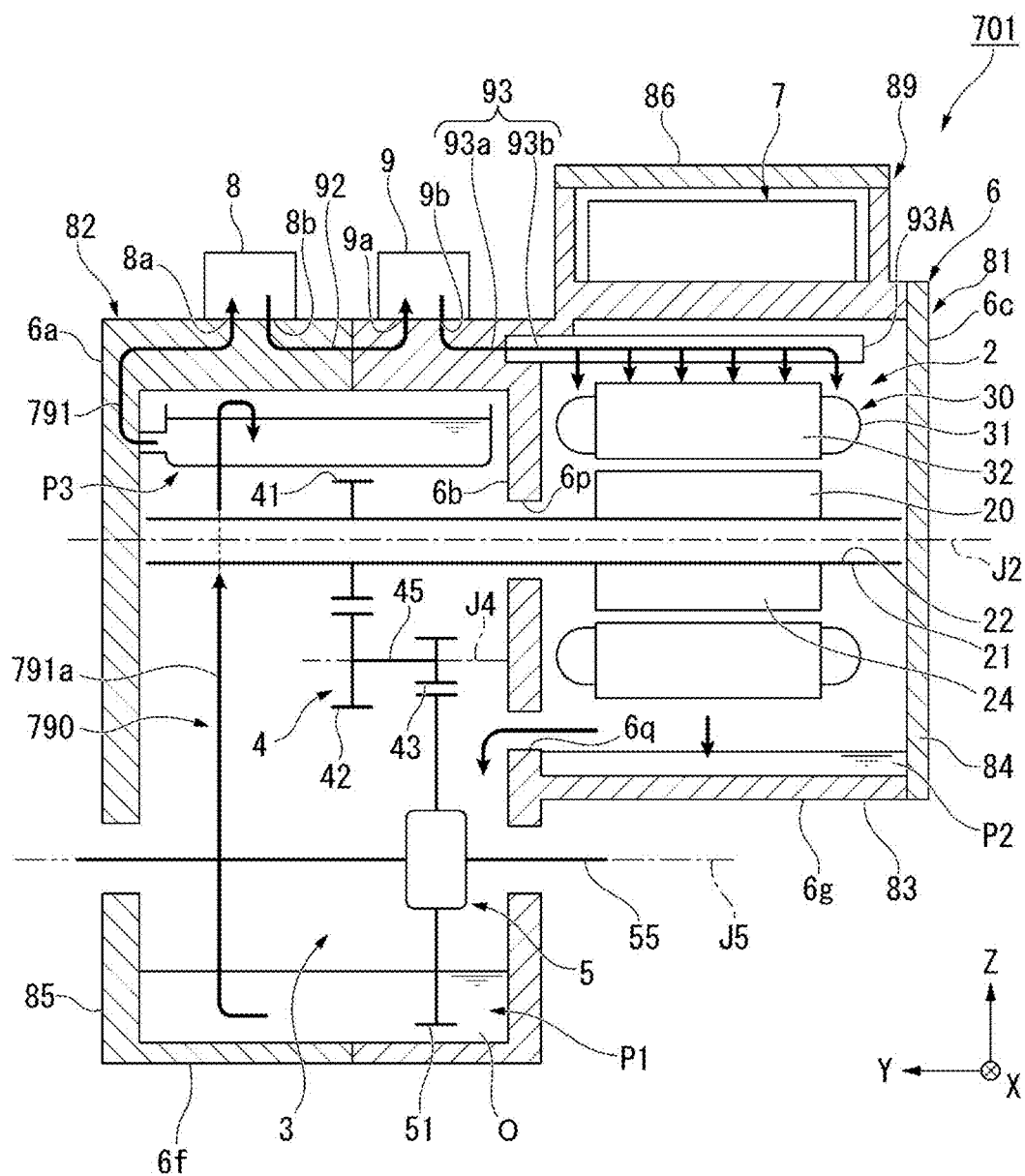
FIG. 11 is a schematic view of a drive apparatus according to an eighth embodiment.

FIG. 11 is a schematic view of a drive apparatus 701 according to an eighth embodiment.

The drive apparatus 701 of the present embodiment is different from that of the first embodiment mainly in the configuration of a refrigerant channel 790.

In the present embodiment, a catch tank (third refrigerant pool) P3 is provided in the inside of the gear accommodation portion 82. The catch tank P3 opens upward to store the refrigerant O. The catch tank P3 is located above the first refrigerant pool P1 and the second refrigerant pool P2. The catch tank P3 of the present embodiment stores the refrigerant O above the motor axis J2. Here, storing the refrigerant O above the motor axis J2 means that the lower end of the storage space in which the refrigerant O is stored is located above the motor axis J2.

The catch tank P3 is, for example, a gutter member protruding from the inner side face of the gear accommodation portion 82. In this case, the catch tank P3 is a part of the housing 6. The catch tank P3 may be a member separate from the housing 6. The catch tank P3 is connected to the inner side face of the gear accommodation portion 82. The catch tank P3 functions as a refrigerant pool. Therefore, the refrigerant pool provided in the inside of the housing 6 includes, in addition to the first refrigerant pool P1 provided in the lower region inside the gear accommodation portion 82 and the second refrigerant pool P2 provided in the lower region inside the motor housing portion 81, the third refrigerant pool (catch tank) P3 located above the first refrigerant pool P1 inside the gear accommodation portion 82.

The refrigerant channel 790 of the present embodiment includes a scraping channel 791a in addition to a first flow passage 791, the second flow passage 92, and the third flow passage 93.

The scraping channel 791a is a channel that scraps up the refrigerant O by the rotation of the gear (the ring gear 51 in the present embodiment) of the power transmission mechanism 3 and guides the refrigerant O to the catch tank P3. That is, in the refrigerant channel 790 of the present embodiment, the refrigerant O is supplied from the first refrigerant pool P1 to the catch tank P3 by scraping of the gear of the power transmission mechanism 3.

In the present embodiment, the first flow passage 791 connects the catch tank P3 and the suction port 8a of the pump 8. That is, in the present embodiment, the refrigerant pool connected to the first flow passage 791 is the catch tank P3.

In the present embodiment, the pump 8 and the cooler 9 are fixed to the outer side face of the housing 6 in a region overlapping at least a part of the gear accommodation portion 82 in the radial direction above the horizontal plane including the motor axis J2. Therefore, the pump 8 and the cooler 9 can be disposed close to each other, and the second flow passage 92 connecting the pump 8 and the cooler 9 can be shortened. Further, according to the present embodiment, since the catch tank P3 is disposed above the first refrigerant pool P1, the first flow passage 791 can be shortened. As a result, the pipeline resistance of the refrigerant channel 790 can be suppressed.

While various embodiments of the present invention and modifications thereof have been described above, it will be understood that features, a combination of the features, and so on according to each of the embodiments and the modifications thereof are only illustrative and not restrictive, and that an addition, elimination, and substitution of a feature(s), and other modifications can be made without departing from the scope and spirit of the present invention. Also note that the present invention is not limited by the embodiment.

The refrigerant channel 90 is not necessary provided with the supply pipe 93A. In this case, the motor housing portion 81 has at least one cavity inside a side wall. The refrigerant channel 90 is provided with the cavity. The cavity extends along the axial direction above the motor 2 inside the side wall of the motor housing portion 81. Third flow passage 93 extends into the inside of the side wall of the motor housing portion 81. The side wall of the motor housing portion 81 has at lease one injection hole connected to the cavity. The refrigerant O supplied to the third flow passage 93 flows along the axial direction on the upper side of the motor 2. The refrigerant O in the third flow passage is injected to the stator 30 via the injection hole of the side wall of the motor housing portion 81.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus comprising:
a motor having a motor shaft that rotates about a motor axis;
a power transmission mechanism connected to the motor shaft from one side in an axial direction;
a housing having a motor housing portion that houses the motor therein and a gear accommodation portion that houses the power transmission mechanism therein;
a refrigerant channel through which a refrigerant circulates;
a cooler configured to cool the refrigerant; and
a pump configured to pressure-feed the refrigerant, wherein the refrigerant channel includes:
a first flow passage connecting a refrigerant pool in the housing and a suction port of the pump;
a second flow passage connecting a discharge port of the pump and an inflow port of the cooler; and
a third flow passage that extends from an outflow port of the cooler to an inside of the motor housing portion and supplies the refrigerant to the motor,
the cooler is fixed to an outer side face of the housing in a region overlapping at least a part of the gear accommodation portion in a radial direction above a horizontal plane including the motor axis, and
the housing has a partition that partitions an internal space of the motor housing portion and an internal space of the gear accommodation portion, and at least a part of the cooler overlaps the partition in a radial direction.

2. The drive apparatus according to claim 1, wherein at least one of the first flow passage and the second flow passage is disposed inside a wall of the housing.

3. The drive apparatus according to claim 1, wherein the refrigerant pool is a first refrigerant pool provided in a lower region in the housing, and the pump is located below a horizontal plane including the motor axis.

4. The drive apparatus according to claim 3, wherein the housing has a cover wall portion that covers one side in the axial direction of the power transmission mechanism, and
the second flow passage is disposed in an inside of the cover wall portion along a wall surface of the cover wall portion.

5. The drive apparatus according to claim 2, wherein the second flow passage is disposed in an inside of the partition along a wall surface of the partition.

6. The drive apparatus according to claim 1, wherein the motor shaft has a hollow shape having a hollow portion extending in an axial direction, and
the refrigerant channel includes:
an intra-shaft flow passage passing through the hollow portion of the motor shaft; and
a fourth flow passage connecting a discharge port of the pump and an end portion on one side in an axial direction of the intra-shaft flow passage.

7. The drive apparatus according to claim 6, wherein the fourth flow passage is a flow passage branching from a channel of the second flow passage inside a wall of the housing.

8. The drive apparatus according to claim 6, wherein the motor shaft has a communication hole extending along a radial direction and allowing an inside and an outside of the hollow portion to communicate with each other.

9. The drive apparatus according to claim 1, wherein the motor shaft has a hollow shape that opens to an inside of the gear accommodation portion at an end portion on one side in the axial direction and has a hollow portion extending in the axial direction, and
the refrigerant channel includes:
an intra-shaft flow passage passing through the hollow portion of the motor shaft; and
a sixth flow passage connecting a discharge port of the cooler and an end portion on one side in the axial direction of the intra-shaft flow passage.

10. The drive apparatus according to claim 9, wherein the sixth flow passage is a flow passage branching from a channel of the third flow passage.

11. The drive apparatus according to claim 1, wherein the motor shaft has a hollow shape that opens to an inside of the motor housing portion at an end portion on another side in an axial direction and has a hollow portion extending in an axial direction, and
the refrigerant channel includes:
an intra-shaft flow passage passing through the hollow portion of the motor shaft; and
a tenth flow passage connecting a downstream end portion of the third flow passage and an end portion on another side in an axial direction of the intra-shaft flow passage.

12. A drive apparatus comprising:
a motor having a motor shaft that rotates about a motor axis;
a power transmission mechanism connected to the motor shaft from one side in an axial direction;
a housing having a motor housing portion that houses the motor therein and a gear accommodation portion that houses the power transmission mechanism therein;
a refrigerant channel through which a refrigerant circulates;
a cooler configured to cool the refrigerant; and
a pump configured to pressure-feed the refrigerant, wherein the refrigerant channel includes:
a first flow passage connecting a refrigerant pool in the housing and a suction port of the pump;
a second flow passage connecting a discharge port of the pump and an inflow port of the cooler; and
a third flow passage that extends from an outflow port of the cooler to an inside of the motor housing portion and supplies the refrigerant to the motor,
the cooler is fixed to an outer side face of the housing in a region overlapping at least a part of the gear accommodation portion in a radial direction above a horizontal plane including the motor axis, wherein
the motor shaft has a hollow shape that opens to an inside of the gear accommodation portion at an end portion on one side in the axial direction and has a hollow portion extending in the axial direction through an entirety of the motor shaft including both axial ends of the motor shaft, and
the refrigerant channel includes:
an intra-shaft flow passage passing through the hollow portion of the motor shaft; and
a fourth flow passage connecting a discharge port of the cooler and an end portion on one side in the axial direction of the intra-shaft flow passage.

13. A drive apparatus comprising:
a motor having a motor shaft that rotates about a motor axis;
a power transmission mechanism connected to the motor shaft from one side in an axial direction;
a housing having a motor housing portion that houses the motor therein and a gear accommodation portion that houses the power transmission mechanism therein;
a refrigerant channel through which a refrigerant circulates;
a cooler configured to cool the refrigerant; and
a pump configured to pressure-feed the refrigerant, wherein the refrigerant channel includes:
a first flow passage connecting a refrigerant pool in the housing and a suction port of the pump;
a second flow passage connecting a discharge port of the pump and an inflow port of the cooler; and
a third flow passage that extends from an outflow port of the cooler to an inside of the motor housing portion and supplies the refrigerant to the motor,
the cooler is fixed to an outer side face of the housing in a region overlapping at least a part of the gear accommodation portion in a radial direction above a horizontal plane including the motor axis, wherein
the motor shaft has a hollow shape that opens to an inside of a wall of the motor housing portion at both end faces of the motor shaft in an axial direction and has a hollow portion extending in an axial direction, and
the refrigerant channel includes:
an intra-shaft flow passage passing through the hollow portion of the motor shaft; and
a fourth flow passage connecting a downstream end portion of the third flow passage and an end portion on another side in an axial direction of the intra-shaft flow passage.

\* \* \* \* \*